(12) United States Patent
Rambadt

(10) Patent No.: US 8,215,552 B1
(45) Date of Patent: Jul. 10, 2012

(54) CONCEALED RFID READER

(75) Inventor: John Rambadt, Gravette, AR (US)

(73) Assignee: R & R Packaging, Inc., Gravette, AR (US)

( * ) Notice: Subject to any disclaimer, the term of this patent is extended or adjusted under 35 U.S.C. 154(b) by 308 days.

(21) Appl. No.: 12/661,886

(22) Filed: Mar. 25, 2010

Related U.S. Application Data

(60) Provisional application No. 61/211,005, filed on Mar. 25, 2009.

(51) Int. Cl.
*G06K 7/00* (2006.01)
(52) U.S. Cl. ........................................ 235/435
(58) Field of Classification Search ................ 235/435, 235/439; 340/572.4
See application file for complete search history.

(56) References Cited

U.S. PATENT DOCUMENTS

| | | | |
|---|---|---|---|
| 5,111,290 A * | 5/1992 | Gutierrez | 348/143 |
| 5,347,263 A | 9/1994 | Carroll et al. | 340/572 |
| 5,430,441 A | 7/1995 | Bickley et al. | 340/825.54 |
| 5,446,447 A | 8/1995 | Carney et al. | 340/572 |
| 5,519,381 A | 5/1996 | Marsh et al. | 340/572 |
| 6,392,544 B1 | 5/2002 | Collins et al. | 340/572.7 |
| 6,396,438 B1 | 5/2002 | Seal | 342/127 |
| 6,509,836 B1 | 1/2003 | Ingram | 340/572.7 |
| 6,747,560 B2 | 6/2004 | Stevens, III | 340/572.4 |
| 6,903,656 B1 | 6/2005 | Lee | 340/572.1 |
| 7,500,870 B2 * | 3/2009 | Picolli | 439/535 |
| 7,596,359 B2 * | 9/2009 | Kimoto et al. | 455/137 |

* cited by examiner

*Primary Examiner* — Seung Lee
(74) *Attorney, Agent, or Firm* — Keisling & Pieper PLC; Meredith K. Lowry

(57) ABSTRACT

A housing for concealing a RFID system is provided including one or more radio frequency antennas, one or more RFID readers, and a central frame. The central frame is attached and concealed within body of a store mannequin providing an exterior shell that is aesthetically pleasing and that can be dressed in store merchandise, thus advertising the store goods and protecting the structure from damage.

19 Claims, 4 Drawing Sheets

000
CONCEALED RFID READER

CROSS-REFERENCE TO RELATED APPLICATIONS

This application claims priority to and is a continuation-in-part of U.S. application Ser. No. 61/211,005, filed Mar. 25, 2009, the entirety of which is hereby incorporated by reference.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to the field of radio frequency identification (RFID) systems. In particular, the present invention relates specifically to concealing structures for supporting RFID antennas and/or RFID readers.

2. Description of the Known Art

As will be appreciated by those skilled in the art, radio frequency identification (RFID) has become a prevalent method for identifying products. Namely, manufacturers and large-scale retailers have increasingly implemented the use of RFID technology to track product locations in route to retail outlets, within storage locations, and within retail stores. RFID readers are used to receive data transmitted from RFID tags. The data transmitted by the tag may provide identification or location information, or specifics about the product tagged, such as price, color, date of purchase, etc. Art relevant to this field can be found in class 235, subclasses 435, 439, 451 and class 343, subclasses 700, 874, 875. Patents disclosing information relevant to RFID technology include U.S. Pat. No. 5,347,263, issued to Carroll et al. on Sep. 13, 1994; U.S. Pat. No. 5,430,441, issued to Bickley et al. on Jul. 4, 1995; U.S. Pat. No. 5,446,447, issued to Carney et al. on Aug. 29, 1995; U.S. Pat. No. 5,519,381, issued to Marsh et al. on May 21, 1996; U.S. Pat. No. 6,392,544, issued to Collins et al. on May 21, 2002; U.S. Pat. No. 6,396,438, issued to Seal on May 28, 2002; U.S. Pat. No. 6,509,836, issued to Ingram on Jan. 21, 2003; U.S. Pat. No. 6,747,560, issued to Stevens on Jun. 8, 2004; and U.S. Pat. No. 6,903,656, issued to Lee on Jun. 7, 2005. Each of these patents is hereby expressly incorporated by reference in their entirety.

RFID systems usually include at least one radio frequency antenna and a reader. During a typical usage, the RFID system transmits a radio frequency at a certain frequency or within a certain frequency range towards an RFID tag. An RFID tag typically includes a chip (often smaller than a pin head) and an antenna portion. The energy in the radio waves transmitted onto the tag may be used to "excite" or energize the tag. The chip is often programmed with a globally unique identification (GUID) number, and upon exciting the tag, the GUID number is emitted from the tag in the form of radio waves. A receiving antenna of the RFID system receives the radio waves emitted from the tag, and a reader device extracts the GUID number from the signal in the tag's emitted radio waves. This GUID number may then be correlated to a product or item in a database. The transmitting antenna may be separate from the receiving antenna (e.g., pitch-catch configuration), or they may be one and the same (i.e., transmit and receive with same antenna).

RFID systems may have a variety of forms and configurations for different applications, for example: hand held devices such as a wand; free standing structures monitoring theft detection in retail stores or warehouse inventory tracking; and fixed structures attached to or extending from a building, such as building access locks and toll tag structures above a toll road. In most existing retail usages of RFID systems, the RFID system is housed in a rectangular vertical structure near the doorway. These structures can become unsightly throughout their life span, with constant exposure to passersby and collisions with shopping carts or other implements. The structure itself can also be unappealing visually. Thus, there is a need in the market to present a RFID structure that is visually appealing, can be protected by damage by consumers, and that provides an advertising element for the store without significantly compromising the ability to tune the system, without significantly hindering the performance of the system, and without consuming a significant amount of store space. Furthermore, it would be preferable to provide such a system without it being overly complex and expensive.

Patents disclosing information relevant to housings for RFID readers include U.S. Pat. No. 5,378,880, issued to Eberhardt on Jan. 3, 1995; U.S. Pat. No. 6,445,297, issued to Nicholson on Sep. 3, 2002; U.S. Pat. No. 7,036,734, issued to Baker on May 2, 2006; and U.S. Pat. No. 7,411,507, issued to Casden on Aug. 12, 2008. Each of these patents is hereby expressly incorporated by reference in their entirety.

U.S. Pat. No. 5,378,880, issued to Eberhardt on Jan. 3, 1995 entitled Housing structure for an access control RFID reader. The abstract describes a radio frequency proximity reader has a base plate housing portion that has an essentially rectangular shape with first and second opposed major surfaces and a centrally located bore. A cylindrical housing portion having a concentrically placed bore is attached to the base plate and extends substantially perpendicular to the first major surface, with the bores of the housing portions being substantially aligned. A radio frequency antenna including a cylindrical ferrite core having at least one concentrically wound coil is concentrically located within the cylindrical housing portion. A light emitting diode and a piezo buzzer are provided within the cylindrical housing portion adjacent the second major surface of the base plate. A cable electronically connects the reader to remotely located signal processing circuits. The base plate may be attached to a wall, whereby the first surface abuts the wall. A rectangular cover attached to the base plate covers the second major surface of the base plate. However, this housing structure fails to provide a stand-alone housing for an RFID reader for use in an open environment, such as a warehouse.

U.S. Pat. No. 6,445,297, issued to Nicholson on Sep. 3, 2002 entitled Modular RFID antenna system. The abstract describes a modular radio frequency identification device (RFID) antenna system including a plurality of modular RFID antenna segments that can be connected in multiple configurations to allow multi-directional RF communication with at least one RF tag that passes through the field of the antenna system from different directions and at different orientations and a configuration system to design, order, configure, test and operate the modular RFID antenna system. However, this modular system does not provide a resilient housing capable of withstanding hard impacts.

U.S. Pat. No. 7,036,734, issued to Baker on May 2, 2006 entitled Free standing column-shaped structure for housing RFID antennas and readers. The abstract explains an RFID system is provided, which includes one or more radio frequency antennas and a generally column-shaped structure. The generally column-shaped structure supports the antenna (s) therein. The structure may include a base portion, a frame portion, one or more paddle portions, and an external body portion. In such case, the frame portion is attached to and supported by the base portion. The frame portion extends along a longitudinal axis of the structure. Each paddle portion is pivotably coupled to the frame portion. Each paddle portion supports one or more antennas attached thereto. The hollow and elongated external body portion is attached to and supported by the base portion. The external body portion extends along the longitudinal axis. The frame portion, the paddle portion(s), and the antenna(s) are located within the external body portion. However, this structure fails to provide a bollard to reduce impacts to the portion and provide a notification access that allows for meaningful interpretation of the RFID reader alters.

U.S. Pat. No. 7,411,507, issued to Casden on Aug. 12, 2008 entitled Metal housing with integral antenna for RFID reader/ writer. The abstract describes enhanced physical protection against vandalism for RFID reader/writer units is provided by a relatively thick metal front or housing which also functions as the antenna element of the reader/writer. The metal front is cut or slotted to define a radio frequency antenna integral with the metal front or housing for improved physical protection and good unshielded antenna function. However, this housing structure fails to provide a stand-alone housing for an RFID reader for use in an open environment such as a warehouse.

Thus, it may be seen that these prior art patents are very limited in their teaching and utilization, and an improved RFID reader housing is needed to overcome these limitations.

SUMMARY OF THE INVENTION

The present invention is directed to an improved housing for a radio frequency identification (RFID) system. In accordance with the present invention, a housing for concealing a RFID system is provided including one or more radio frequency antennas, one or more RFID readers, and a central frame. The central frame is attached and concealed within body of a store mannequin providing an exterior shell that is aesthetically pleasing and that can be dressed in store merchandise, thus advertising the store goods and protecting the structure from damage. The central frame supports the antenna(s) and reader(s) therein and may be adjusted to allow for the depth of the structure. The hollow and external mannequin body portion is composed of a thick plastic or fiberglass typical of retail mannequins. The mannequin body has an access panel providing entry into the body interior where the frame portion, the RFID readers, and the antennas are located.

RFID systems are commonly used in retail stores, warehouses and loading facilities to assist in tracking packages, products, and merchandise labeled with RFID tags. Other industries additionally utilize RFID systems to track movement of vehicles, luggage, or other transient objects. In most existing retail usages of RFID systems, the RFID system is housed in a rectangular vertical structure near the doorway. These structures can become unsightly throughout their life span, with constant exposure to passersby and collisions with shopping carts or other implements. The structure itself can also be unappealing visually.

Thus, it is an object of the present invention to present a RFID structure that is visually appealing, can be protected by damage by consumers, and that provides an advertising element for the store without significantly compromising the ability to tune the system, without significantly hindering the performance of the system, and without consuming a significant amount of store space.

It is also an object of the present invention to provide a portable housing for an RFID reader.

It is an object of the present invention to provide a housing with audio and video capabilities.

It is a further object to provide a housing that only requires access to a network.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
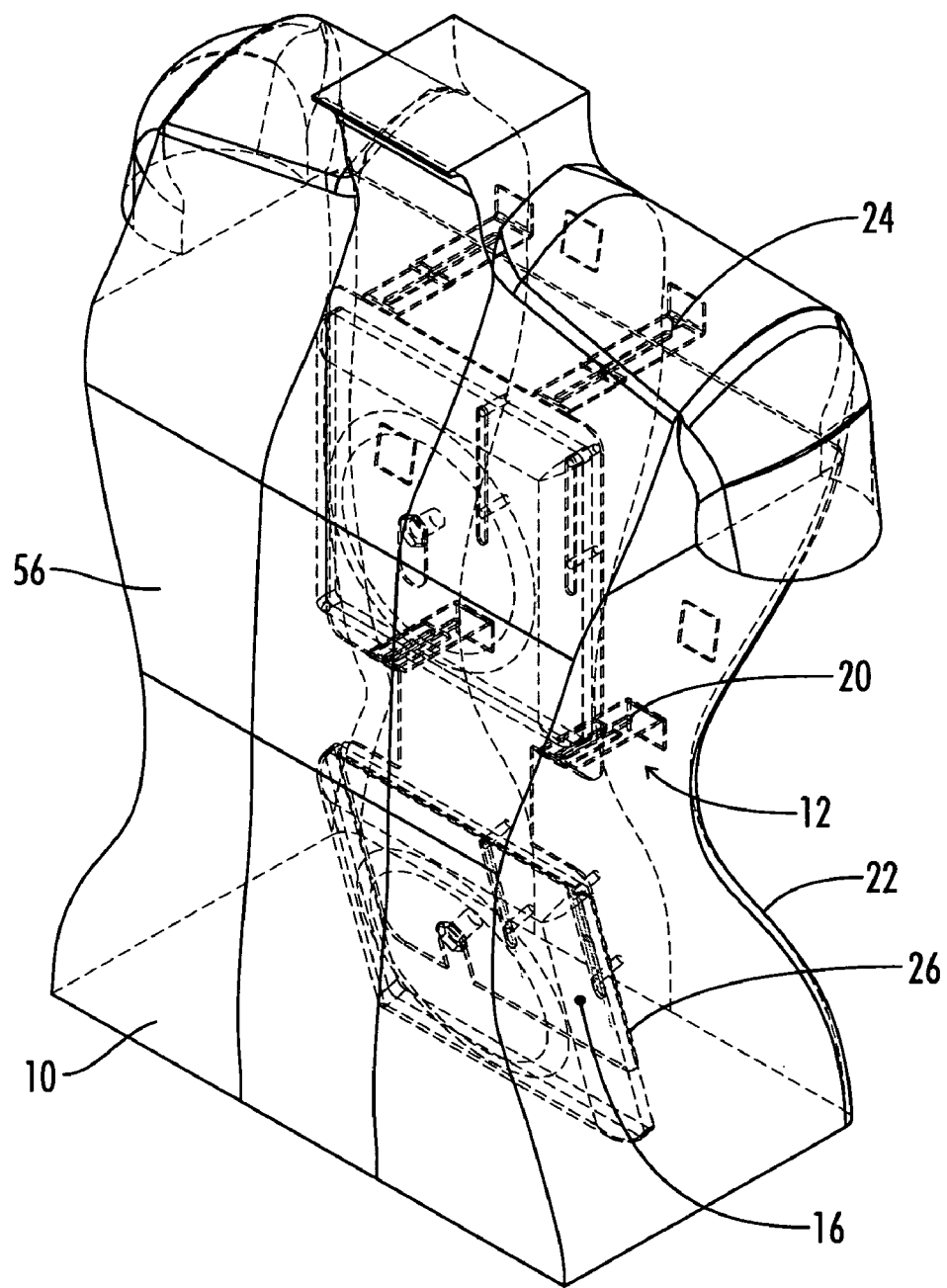
FIG. 1 is a front perspective view of our invention, the concealed RFID system, showing the RFID reader and frame therefor through the mannequin.
Figure 2:
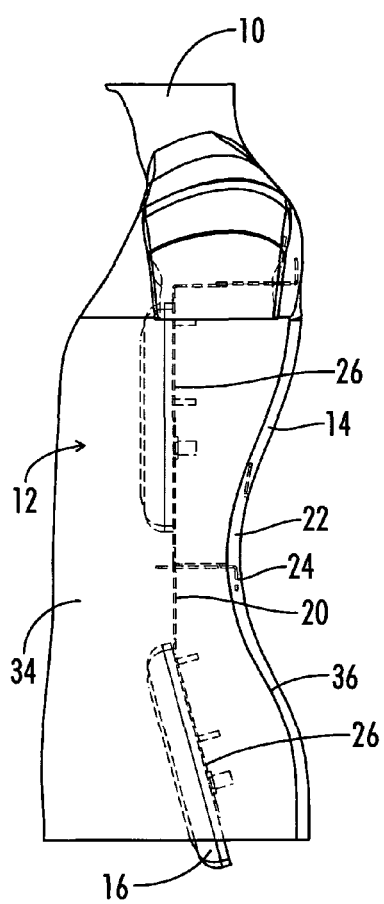
FIG. 2 is a left side elevational view of the same.
Figure 3:
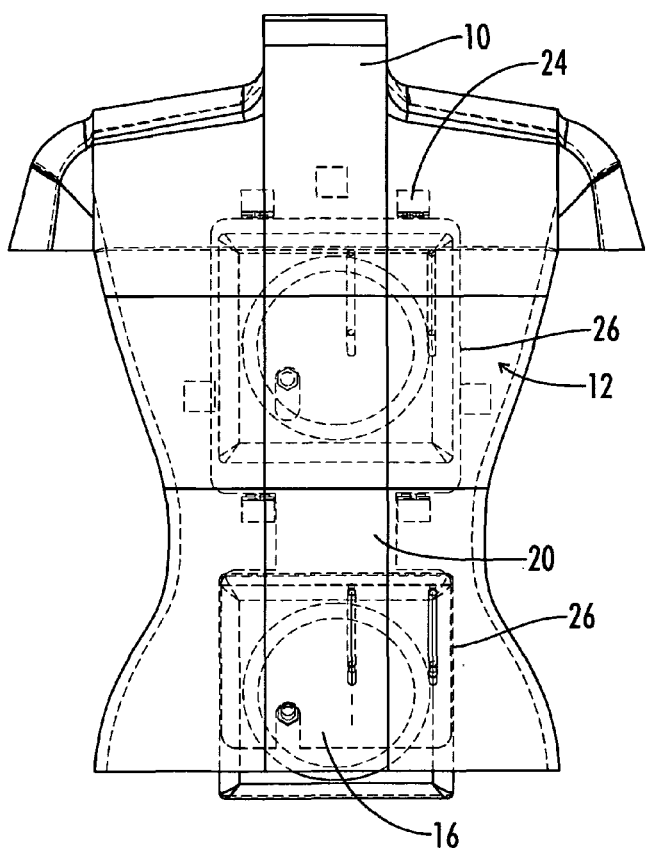
FIG. 3 is a rear elevational view of the same.

As shown in FIG. 1-3 of the drawings, one exemplary embodiment of the present invention is generally shown as a housing 10 for a radio frequency identification (RFID) system 12 for use with RFID tags (not shown) is provided including one or more radio frequency antennas 16, one or more RFID readers 18 and a frame 20. The frame 20 supports the antenna(s) 16 and reader(s) 18 therein. The frame 20 is secured to the interior of the mannequin housing. Each of the unique elements will be discussed in turn.

The housing 20 has a solid exterior structure with an open interior space 34. The housing 20 is composed of an impact resistant thermoplastic resin or reinforced plastic such as glass-reinforced plastic or fiber-reinforced plastic. Some commonly used thermoplastic resins include polyethylene, polypropylene and polyvinyl chloride (PVC). High density polyethylene (HDPE) is a preferred thermoplastic resin as is with linear low density polyethylene (LLDPE) and low density polyethylene (LDPE). Especially advantageous are mixes of HDPE and LLDPE and LDPE, which combine benefits of all three plastic types. To allow a user to view the inside of the housing, an in particular the reader 18 which may have an information panel or the housing 10 may include a transparent panel insert or removable panel 14 on the back 22 of the housing to expose the information panel of the RFID reader 18.

The housing exterior shell 50, as shown in FIGS. 1-3, may be formed in a distinct shape such as a human mannequin. Many RFID system housings are unsightly and take up retail space without providing any other benefit than monitoring products. A housing shell 50 that is modeled to a shape that can be utilized in the retail environment, such as a mannequin or other display fixtures, such as cube structures, gondolas, and display racks. As shown, the housing exterior 50 is formed in the shape of a human torso having a front, rear, right and left side. The frame 20 is secured within the interior chest cavity 34 of the mannequin 10.

Figure 4:
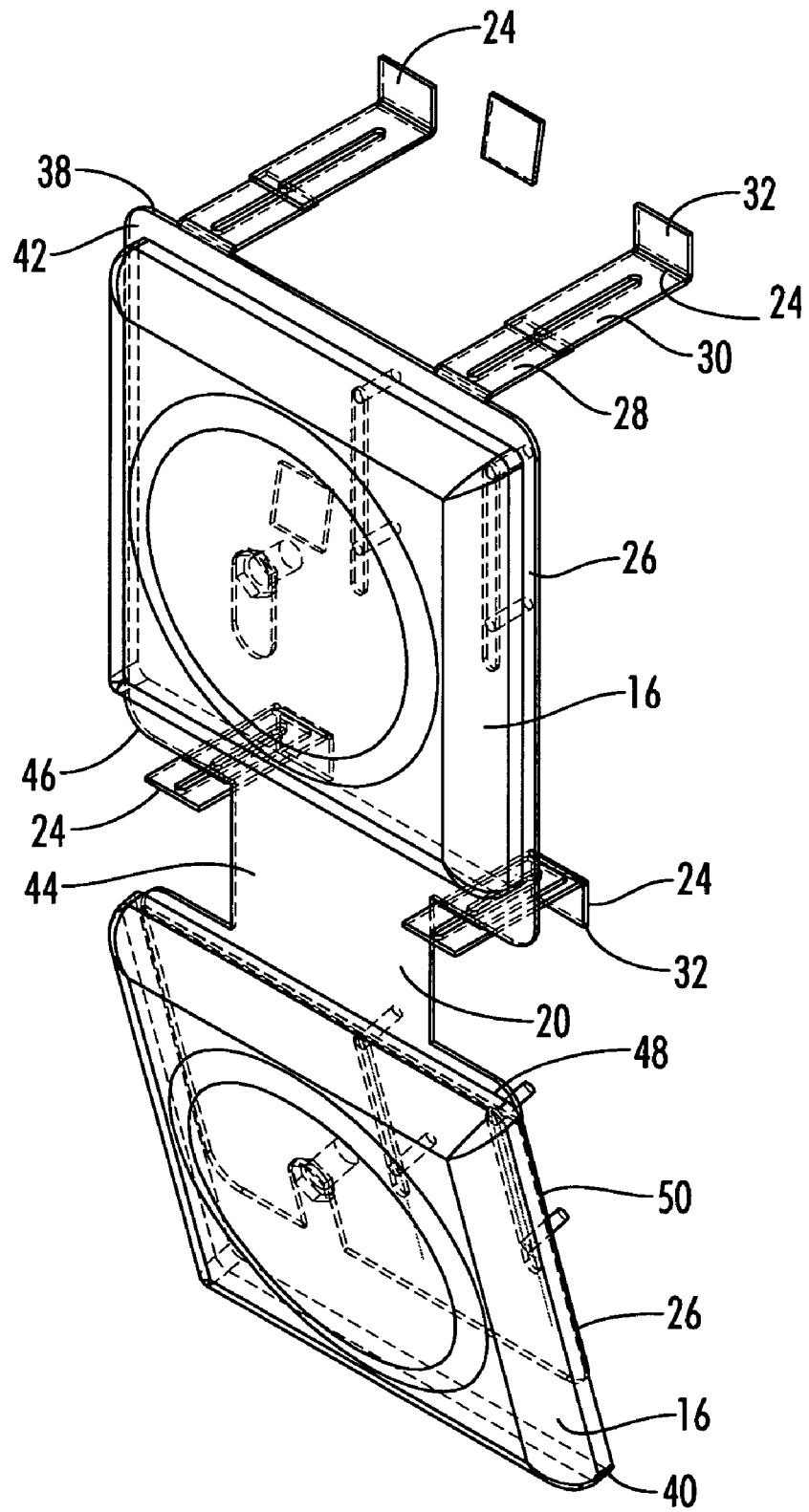
FIG. 4 is a front perspective view of the RFID reader and frame therefor.
Figures 5, 6:
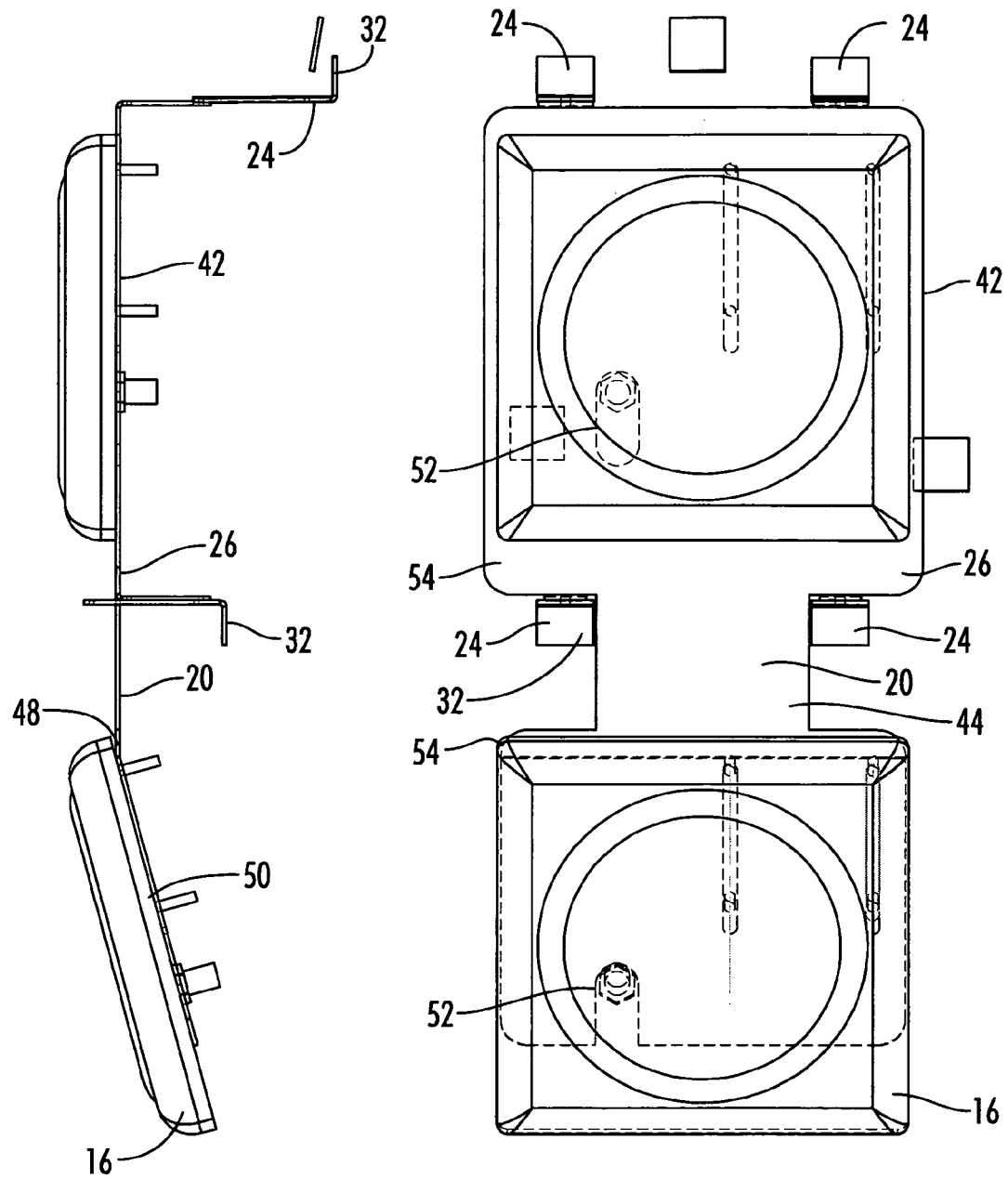
FIG. 5 is a left side elevational view of the same.
FIG. 6 is a rear elevational view of the same.

The frame 20 extends along the longitudinal axis of the structure. The frame 20 supports one or more antenna(s) 16 and reader(s) 18 attached thereto. Antennas 16 and readers 18 may be mounted on both the top and bottom of the housing 10. As shown in FIGS. 4-6, the frame 20 includes four brackets 24 securing the frame 20 to the housing 10 and two planar mounts 26 providing space for attaching the antenna(s) 16 and reader(s) 18. The brackets 24 extend outward from the frame 20 perpendicular to the longitudinal axis of the housing 10. The brackets 24 have a planar first leg 28 which telescopes into a planar second leg 30. It is envisioned that the second leg 30 can conversely telescope into the first leg 28. The telescoping brackets 24 allow the frame 20 to be positioned within the center of the interior space 34 of the housing 10. In this manner, the RFID system can effectively detect RFID tags on either side of the housing 10. A frame mount 32 is secured to the end of the second leg 30 perpendicular to the second leg 30. The frame mount 32 is adapted to affix to the interior surface 36 of the housing 10 and may include an aperture for a fastener.

The frame 20 has two planar mounts 26, one at the top 38 and one at the bottom 40 of the frame 20. The top mount 42 has two brackets 24 connected to the top of the mount 42 and two brackets 24 connected to the bottom 46 of the mount 42. The mounts 26 are connected by a strip 44 of frame 20 extending from the bottom 46 of the top mount 26 to the top 48 of the bottom mount 50. Each mount 26 has an aperture 52 which allows attachment of the antenna 16 or reader 18. Both planar mounts 26 are flat, quadrilateral structures with a front face 54 and rear face. The front face 54 is oriented towards the front of the housing 10 and allows for the antenna 16 or reader 18 to be placed on the face 54. The top mount 42 is oriented parallel to the longitudinal axis of the housing 10. The bottom mount 50 is oriented backwards at an angle from the longitudinal axis of the housing 10. In this manner, the bottom mount 50 can fit within the mannequin housing 10 as it becomes narrower in depth through the midsection of the mannequin.

The frame 20 and the supporting mounts therein can be constructed of any durable material. It is envisioned that steel or another strong metal is the best material.

The frame 20 may also include ports for video and audio equipment for surveillance and notification to shoppers. Additionally, the frame 20 or the housing 10 may contain motion sensors or proximity monitors programmed to alert a user if someone comes too close to the housing 10 or attempts to move the housing 10.

The housing 10 may provide access for electrical wiring to provide power to the housing 10 or contain a port in the frame 20 to allow for attachment of an electrical supply. The housing 10 may provide access for data transfer wiring to provide remote access or information to support personnel. Within the interior of the housing, an electrical housing provides space for wiring. In a preferred embodiment, the readers 18 and antennas 16 will only require a connection via a network cable which can be discreetly attached to the unit.

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically referring to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures.

What is claimed is:

1. A housing containing a radio frequency identification (RFID) system having a radio frequency antenna and an RFID reader, said housing comprising:
    an exterior shell resembling a human form, said exterior shell comprising a human torso;
    an interior frame extending along the longitudinal axis of said housing, said frame comprising
    at least one bracket to secure said frame to said exterior shell, said at least one bracket comprising a first leg in telescoping relation with a second leg; and
    at least one mount securing the RFID antenna to said frame, said at least one mount having a planar face adapted to secure the radio frequency antenna to said frame.

2. The frame of claim 1, said at least one mount comprising a first mount having a planar face oriented parallel to the longitudinal axis of said housing and a second mount having a planar face oriented at an angle to the longitudinal axis of said housing.

3. The frame of claim 1, said at least one mount comprising a mount having a planar face oriented parallel to the longitudinal axis of said housing.

4. The frame of claim 1, said at least one mount comprising a mount having a planar face oriented at an angle to the longitudinal axis of said housing.

5. The housing of claim 1, wherein the housing has at least one port providing remote data transmission access and remote electrical supply access.

6. The frame of claim 1, further having at least two antenna mounts adapted to attach radio frequency antennas of different sizes to said frame.

7. The frame of claim 1, further having at least two mounts adapted to attach RFID antennas to said frame.

8. A housing containing a radio frequency identification (RFID) system having a radio frequency antenna, said housing comprising:
    an exterior shell resembling a human form, said exterior shell comprising a human torso;

a frame extending along the longitudinal axis of said housing, said frame having at least one bracket to secure said frame to said exterior shell and at least one mount securing the radio frequency antenna to said frame, said at least one mount having a planar face adapted to attach the radio frequency antenna to said frame.

9. The frame of claim 8, said at least one bracket comprising a first leg in telescoping relation with a second leg.

10. The frame of claim 8, said at least one mount comprising a first mount having a planar face oriented parallel to the longitudinal axis of said housing and a second mount having a planar face oriented at an angle to the longitudinal axis of said housing.

11. The frame of claim 8, said at least one mount comprising a mount having a planar face oriented parallel to the longitudinal axis of said housing.

12. The frame of claim 8, said at least one mount comprising a mount having a planar face oriented at an angle to the longitudinal axis of said housing.

13. The housing of claim 8, wherein the housing has at least one port providing remote data transmission access and remote electrical supply access.

14. The frame of claim 8, further having at least two antenna mounts adapted to attach radio frequency antennas of different sizes to said frame.

15. The frame of claim 8, further having at least two mounts adapted to attach RFID antennas to said frame.

16. A housing having an exterior shell resembling a human form and containing a radio frequency identification (RFID) system having a radio frequency antenna, said housing comprising:

a frame extending along the longitudinal axis of said housing, said frame having at least one mount securing the radio frequency antenna to said frame, said at least one mount having a planar face adapted to attach the radio frequency antenna to said frame; and at least one bracket to secure said frame to the exterior shell, said at least one bracket comprising a first leg in telescoping relation with a second leg.

17. The frame of claim 16, said at least one mount comprising a first mount having a planar face oriented parallel to the longitudinal axis of said housing and a second mount having a planar face oriented at an angle to the longitudinal axis of said housing.

18. The frame of claim 16, said at least one mount comprising a mount having a planar face oriented parallel to the longitudinal axis of said housing 19. The frame of claim 16, said at least one mount comprising a mount having a planar face oriented at an angle to the longitudinal axis of said housing.

\* \* \* \* \*